H. F. T. HALE.
Velocipede.

No. 92,044.    Patented June 29, 1869.

Witnesses    Inventor

United States Patent Office.

H. F. T. HALE, OF EAST SAGINAW, MICHIGAN.

Letters Patent No. 92,044, dated June 29, 1869.

---

IMPROVEMENT IN VELOCIPEDES.

---

The Schedule referred to in these Letters Patent and making part of the same.

---

*To all whom it may concern:*

Be it known that I, H. F. T. HALE, of East Saginaw, in the county of Saginaw, and State of Michigan, have invented a new and improved Velocipede; and I do hereby declare that the following is a full, clear, and exact description of the same, reference being had to the accompanying drawings, which form part of this specification.

This invention consists in a novel construction and application of a steadying-device for supporting the velocipede in an upright position when at rest, and which may also be used as a brake for checking the momentum of the machine when desirable.

Referring to the accompanying drawings—

Similar letters of reference indicate corresponding parts in the several figures.

Figure 1:
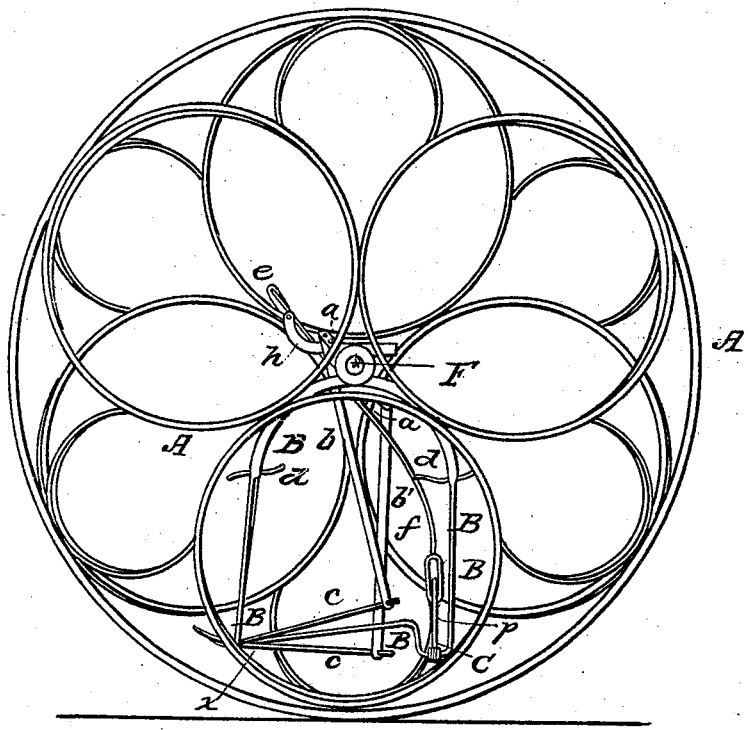
Figure 1 represents a side view of a velocipede constructed according to my invention.
Figure 2:
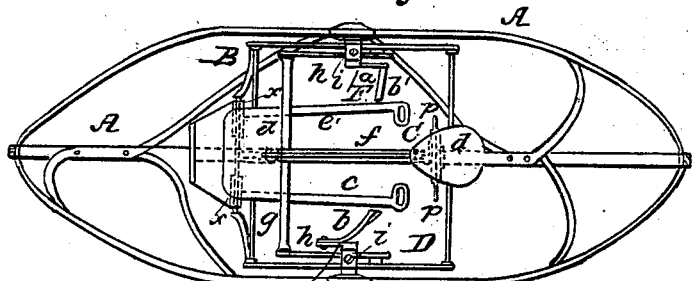
Figure 2 represents a horizontal section of the same.

A is a wheel constructed of strips of hard wood or metal, riveted or otherwise attached to each other, so as to form an open wheel of double-convex form, as shown in the drawings.

In this apparatus, to avoid inconvenience to the operator, the central portion of the axle F is cut away, or rather, the wheel is provided with two short axles F F, projecting inwardly, and carrying upon their inner ends the usual cranks $a$ $a$, from which are suspended the pitman-rods $b$ $b$, connecting with the treadles $c$ $c$, arranged near the ground. Said treadles $c$ $c$, being arranged horizontally, are hinged to the lower extremity of a swinging frame, B, at a point, $x$.

To this frame B, which is pivoted upon the central portion of the short axles F F of the wheel, are secured one or more seats $d$, for support of the rider or riders, so that, by means of its own weight, assisted by the weight of the riders, the said frame is made to hang downwardly while the wheel revolves around it.

Figures 3, 4:
Figures 3 and 4 represent detached views of the combined brake and steadying-support, illustrating its manner of operation.

C is a combined brake and steadying-support, arranged at or near the bottom of the frame B, and consisting of two slotted claws $p$ $p$, pivoted upon a common centre, and operated by a vertical motion of the bipronged and slotted lower extremity of a rod, $f$, as shown in figs. 3 and 4. Said rod $f$ is made to connect with an arm, $e$, carried upon a rocking-sleeve, $g$, which fits easily over the horizontal connection-rod of an adjustable frame, $h$ $h$, so that a half-turn of the rocking-sleeve upon the said connection-rod will, by raising the arm $e$, cause the combined brake and steadying-support C to assume a position, as shown in fig. 3, but by lowering the said arm, to cause the device to change from said position, as shown in fig. 3, to that shown in fig. 4, bringing the points of the said slotted claws in contact with the ground. Said contact is designed to serve as a brake to the machine while it is in motion, and as a support to the same when at rest.

The adjustable frame $h$ $h$ may, by being slipped through its bearings $i$ $i$, be set so as to bring the rocking-sleeve $g$, which is operated by the hands, nearer to or further from the hands of the operator, as convenience may dictate, and retained thereat by means of set-screws or other suitable means.

What I claim as my invention, and desire to secure by Letters Patent, is—

The steadying-support C, consisting of the slotted prongs $p$ $p$, operated by the sliding bifurcated rod $f$, and arm $e$, in combination with a velocipede, substantially as herein set forth.

H. F. T. HALE.

Witnesses:
 IRVING M. SMITH,
 FRANK A. LAWRENCE.